(No Model.)

E. S. GIBBS.
CHURN.

No. 357,661. Patented Feb. 15, 1887.

Witnesses
Chas L. Taylor
J. W. Garner

Inventor
E. S. Gibbs
By his Attorneys

UNITED STATES PATENT OFFICE.

EUGENE SHEPARD GIBBS, OF LYONS, IOWA.

CHURN.

SPECIFICATION forming part of Letters Patent No. 357,661, dated February 15, 1887.

Application filed October 14, 1886. Serial No. 216,259. (No model.)

*To all whom it may concern:*

Be it known that I, EUGENE SHEPARD GIBBS, a citizen of the United States, residing at Lyons, in the county of Clinton and State of Iowa, have invented a new and useful Improvement in Churns, of which the following is a specification.

My invention relates to an improvement in churns; and it consists in the peculiar construction and combination of devices, that will be more fully set forth hereinafter, and particularly pointed out in the claim.

Figure 1:
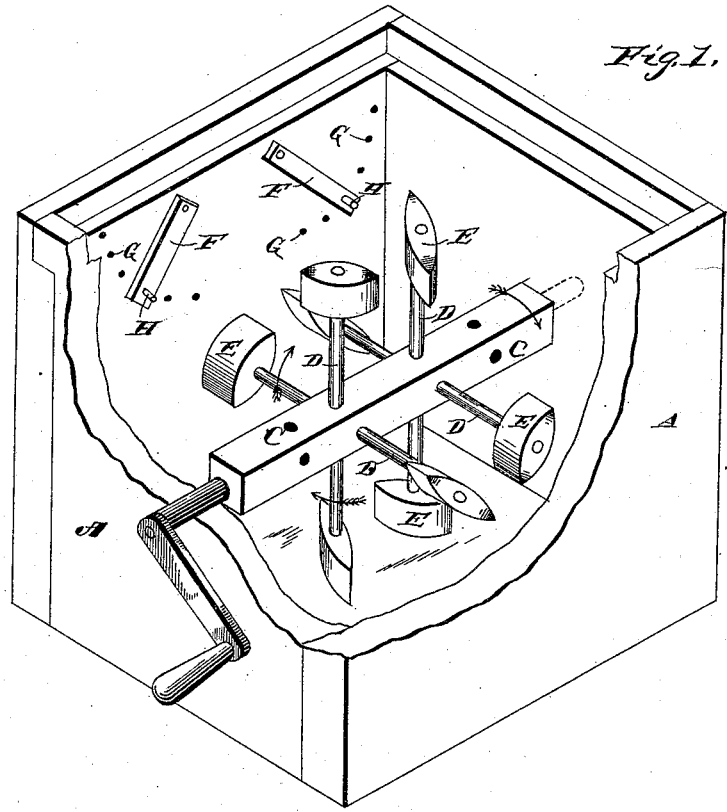
Figure 2:
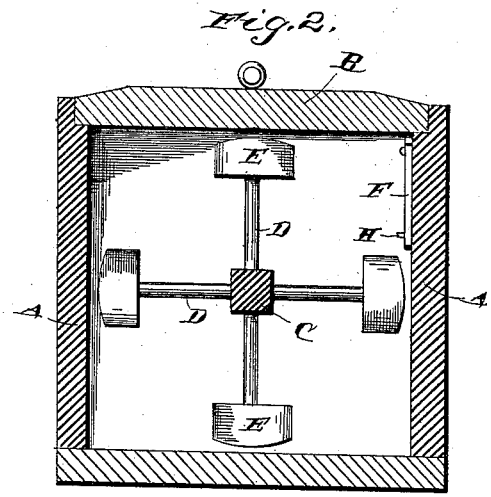

In the drawings, Figure 1 is a perspective view of my invention, a portion of the churn-body being broken away. Fig. 2 is a vertical sectional view.

A represents the churn-body, which is rectangular in shape and is provided with a cover, B.

C represents a shaft, which is journaled in the sides of the churn-body and is provided at one extremity with a crank-handle, whereby the shaft may be readily rotated. D represents radial arms which extend from the central portions of the shaft C, and the outer ends of the said radial arms are provided with beaters or dashers E, which are oval in cross-section, and are arranged at suitable angles to each other.

On the inner side of one wall of the churn-body, at the ends thereof, are secured breakers F, the upper ends of which are pivoted to the side of the churn, and the lower ends of which can be swung through the quarter of a circle in order to adjust them. A series of recesses or openings, G, are made in the sides of the churn-body, the said openings being arranged in segments, which are drawn from the center of the pins or screws on which the breakers are pivoted. The free end of each breaker is provided with a detent pin or bolt, H, which is adapted to engage the openings G, so as to secure the breakers to the side of the churn at any desired inclination.

The operation of my invention is as follows: A suitable quantity of cream is placed in the churn-body and the shaft C is rotated in the direction indicated by the arrow in Fig. 1. As the beaters revolve through the mass of cream the same is violently agitated and divided into currents, which strike on the under inclined sides of the breakers, and are thrown by the said breakers toward the center of the churn, directly in the path of the beaters, thus producing a partial vacuum in the cream and causing the same to be thoroughly aerated, and thereby greatly facilitating the churning process. When the breakers are arranged horizontally and parallel with the level surface of the cream, more force is required to operate the churn, and the more nearly the said breakers are arranged toward the vertical position the less force is required to operate the churn, and consequently the churn may be arranged to suit the strength of the person operating it. When the breakers are arranged at an angle of about forty-five degrees to the level surface of the cream, the best results are attained in churning, and if the shaft is rotated with maximum velocity the cream will be converted into butter in about three minutes.

Having thus described my invention, I claim—

The combination, with the churn having the rotating beaters, of the breakers pivoted to one side of the churn, and the locking pins or bolts G, to secure the said breakers at any desired inclination with relation to the level surface of the cream, substantially as described.

In testimony that I claim the foregoing as my own I have hereto affixed my signature in presence of two witnesses.

EUGENE SHEPARD GIBBS.

Witnesses:
W. E. RUSSELL,
W. D. EDNEY.